J. G. P. THOMAS.
CHARGING OF ACCUMULATORS FROM A VARIABLE SPEED DYNAMO ELECTRIC MACHINE.
APPLICATION FILED MAR. 23, 1914.
1,272,148.
Patented July 9, 1918.
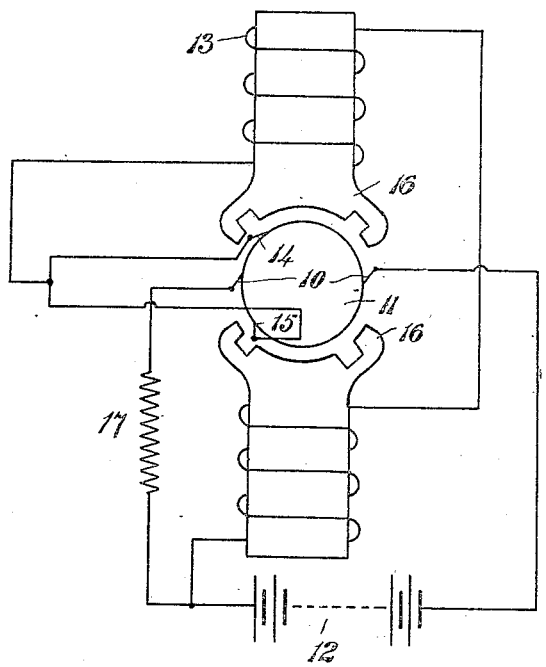
Witnesses
M. E. Elwood
M. L. Clifford
Inventor
John Godfrey Parry Thomas
per Eugene C. Brown
Attorney

UNITED STATES PATENT OFFICE.

JOHN GODFREY PARRY THOMAS, OF CHISWICK, LONDON, ENGLAND, ASSIGNOR TO THOMAS FOREIGN PATENTS LIMITED, OF KENSINGTON, LONDON, ENGLAND, A CORPORATION OF GREAT BRITAIN.

CHARGING OF ACCUMULATORS FROM A VARIABLE-SPEED DYNAMO-ELECTRIC MACHINE.

1,272,148.   Specification of Letters Patent.   Patented July 9, 1918.

Application filed March 23, 1914. Serial No. 826,740.

*To all whom it may concern:*

Be it known that I, JOHN GODFREY PARRY THOMAS, a subject of the King of Great Britain, residing at 21 Ennismore avenue, Chiswick, in the county of London, England, have invented new and useful Improvements in the Charging of Accumulators from a Variable-Speed Dynamo-Electric Machine, of which the following is a specification.

This invention relates to electric generating systems, and its purpose is to provide a system by which substantially constant output is derived from a dynamo electric machine driven at variable speed.

A further object of said invention is to apply to the field winding of an electric generator, the armature of which is bridged across a battery, an E. M. F. opposing the E. M. F. of the battery and varying with the speed of the machine.

By way of illustration of the invention a system is hereinafter described in which a two-pole generator is utilized. A diagram of connections of this system is shown in the accompanying drawings.

The main brushes 10, 10 of the armature 11 are connected directly to the battery 12. The field winding 13 is of the series type and therefore of very low resistance and is connected between one of the main brushes 10 and a brush 14 adjacent to it.

To prevent sparking at the brushes 14, 15 the pole cores 16 may be cut away opposite the conductors to which the brushes are for the time being connected. The field should be so designed that the iron is far from saturation.

The machine is so designed that when a certain minimum speed is exceeded the field is sufficiently excited to produce an E. M. F. a little in excess of that of the battery. The portion of the armature winding between the brushes 14 15 and the more remote brush 10 may be regarded as a motor armature under certain conditions, and in conjunction with the field winding constitutes a series motor, generating a back E. M. F. which in the field circuit opposes the terminal voltage of the generator. Thus assuming the left hand brush 10 to be removed from the commutator for a moment, it will be obvious that this series motor is simply driven from the battery, and in this condition can be used for starting the prime motor by which the generator is to be driven. Since the field resistance is practically negligible the E. M. F. between the right hand brush 10 and the auxiliary brushes 14, 15 will always be substantially the E. M. F. of the battery whatever the speed. And therefore when the machine is operated by the prime motor and the left hand brush 10 is replaced on the commutator, the E. M. F. between the brushes 10 when both of them are on the commutator will always slightly exceed the E. M. F of the battery, and the machine will be capable of charging the battery. The portion of the armature winding between the auxiliary brushes and the right hand brush 10 carries less current than that between the brushes 14 15 and the adjacent brush 10, the difference being the amount of the field current. It is obviously essential to the invention that the field resistance should be exceedingly small, as it is necessary that the E. M. F. between the auxiliary brushes and the right hand brush 10 shall always be practically the battery E. M. F.

A steadying resistor 17 is inserted between the left hand brush 10 and its connection to the field and battery, that is in a position to carry both the charging current and the field current.

It is possible that the regulation is secured by means of resistor 17, and its connections, for the following reasons: The current through resistor 17 is the sum of the current in the battery branch and the branch which includes field winding 13. The current through the battery branch will increase at a greater rate than the increase of voltage applied thereto with any increase of speed. The reason for this is well known and is due to the low internal resistance and constant back electromotive force of the battery. The current through the field branch tends to increase proportionately with the voltage applied thereto. Any increase in drop across resistor 17 will tend to decrease the field current and, as above pointed out, the drop across resistor 17 will increase faster than the machine voltage tends to increase by reason of the tendency of the current in the battery branch to increase disproportionately. If then, the battery component of current in resistor 17 increases as stated, the field current component may be made to decrease as the speed increases.

It is to be noted that the auxiliary brushes are quite close to one main brush and by no means disposed in the middle of the field or anywhere in the neighborhood of the axis of the field. Consequently though the axis of the field may shift a little on account of the cross magnetizing effect of the armature, owing to the regulating effect above described of the resistor 17, this shifting will be very slight and it will never shift past the auxiliary brush. Thus the sign of the E. M. F. applied to the field will never be changed by variation of load, nor will its magnitude vary largely with the load. The subject of the invention is therefore to be distinguished from constant voltage generators which are dependent upon armature reaction for their regulation. It is in practice distinguishable from such machines by the fact that without a battery the machine herein described will not successfully operate as a constant voltage machine, while with a battery it will operate with practically constant voltage. It will also work equally well upon batteries of different voltage so long as the voltage is not such that the iron of the field becomes saturated.

What I claim is:

1. A generating system, comprising a dynamo electric generator, having an armature winding and low resistance field windings and a commutator with brushes thereon, a battery connected across the main brushes of said generator, auxiliary brushes upon said commutator adjacent to and symmetrically disposed about one of said main brushes, and conductors joining said field winding between the auxiliary brushes and the neighboring main brush.

2. A constant voltage generating system, comprising a field structure, a low resistance winding thereon. an armature windings on said armature, a commutator with main brushes thereon, a battery connected across said main brushes, an auxiliary brush adjacent one of said main brushes, connections joining the whole of said field winding between said auxiliary brush and the neighboring main brush, and a regulating or steadying resistance connected to the main brush in circuit with the battery and with the field winding.

In testimony whereof I have signed my name to this specification in the presence of two subscribing witnesses.

JOHN GODFREY PARRY THOMAS.

Witnesses:
A. E. O'DELL,
LEONARD E. HAYNES.